United States Patent
Otsuka et al.

(10) Patent No.: US 7,055,155 B2
(45) Date of Patent: May 30, 2006

(54) CHARACTER STRING PROCESSING METHOD, PROCESSING SYSTEM, AND OBJECT PROGRAM THEREFOR

(75) Inventors: Junichi Otsuka, Ueda (JP); Toshiyuki Sugimoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 634 days.

(21) Appl. No.: 10/026,336

(22) Filed: Dec. 20, 2001

(65) Prior Publication Data

US 2002/0194073 A1    Dec. 19, 2002

(30) Foreign Application Priority Data

Dec. 28, 2000 (JP) .............................. 2000-403300

(51) Int. Cl.
*G06F 9/46* (2006.01)
(52) U.S. Cl. .................................................... 719/316
(58) Field of Classification Search ................ 719/315, 719/316
See application file for complete search history.

(56) References Cited

U.S. PATENT DOCUMENTS

| | | |
|---|---|---|
| 5,263,162 A | 11/1993 | Lundeby |
| 6,108,717 A | 8/2000 | Kimura et al. |
| 6,292,849 B1 | 9/2001 | Kimura et al. |
| 6,304,922 B1 | 10/2001 | Kimura et al. |
| 6,633,923 B1 * | 10/2003 | Kukura et al. ............... 719/316 |

FOREIGN PATENT DOCUMENTS

| | | |
|---|---|---|
| EP | 0 762 273 | 3/1997 |
| GB | 2 330 222 | 4/1999 |
| JP | 9-73395 | 3/1997 |
| JP | 9-106355 | 4/1997 |

* cited by examiner

*Primary Examiner*—William Thomson
*Assistant Examiner*—Andy Ho
(74) *Attorney, Agent, or Firm*—Michael T. Gabrik

(57) ABSTRACT

Character strings containing null can be reliably passed between objects without using a complicated process and without changing the character string type declared by the control object or service object. An interface object for passing character strings from a control object to a service object casts the character string received from the control object as a BSTR type even if the received string is LPCTSTR type, determines the number of characters in the string, converts the string to wide characters without dropping any characters in the string, and creates a COM-standard BSTR type wide character string. Null (0x00) and all following characters in the character string can therefore be reliably passed to the service object.

18 Claims, 3 Drawing Sheets

CHARACTER STRING PROCESSING METHOD, PROCESSING SYSTEM, AND OBJECT PROGRAM THEREFOR

BACKGROUND OF THE INVENTION

1. Field of the Invention

The present invention relates to a character string processing method, processing system and program using software object components.

2. Description of the Related Art

Component-based programs (objects) written in an object-oriented programming language are re-usable software objects that run on a particular operating system. Using objects makes it easier to develop a variety of systems and applications. The Component Object Model (COM) supported by the Microsoft Windows® operating system, for example, is a functionally rich system providing an environment in which client applications (container applications) can use and share objects.

By developing systems based on COM objects, software products can be provided as reusable parts enabling individual users to build customized systems and reduce maintenance costs. This design model also enables the further development and evolution of existing software assets, making system development easier and reducing related development costs. The ability to develop objects on a component basis also simplifies developing a complex system consisting of various subsystems or various peripheral devices, and has become essential to the development of systems operating under a network environment.

A POS (Point-Of-Sale) system is one type of system that can be assembled from a variety of peripheral devices. A typical POS system comprises a display device, a printer, scanner, cash drawer, card reader, and other input/output devices, each connected to a personal computer or other central host computer. A flexible personal computer-based POS system built using objects is described in Japanese Patent Laid-Open Publications (kokai) H9-106355 and H9-73395.

Referring to FIG. 1 of this application, the concept of a distributed object POS system 10 is illustrated. This POS system 10 comprises a POS application program 11 supplied by the system manufacturer; a set of control objects (CO) 12, each for a particular type of device (device class), such as a printer 21, a scanner 22, a cash drawer 23, or other type of peripheral device; and a set of service objects 13 (SO), each for a particular device. To print from the POS application program 11, data is first sent to the printer control object, then to the service object for the particular make or model of the printer from which data will be printed, then to the operating system (OS) 14, and finally to the printer 21.

POS system 10 also typically includes other peripheral devices, such as a display 15, a keyboard 16, and other hardware resources of the personal computer. POS application 11 interacts with each of these other peripheral devices and hardware resources via the OS 14.

The object control system 19 containing the set of control objects 12 and set of service objects 13 provides the POS application program 11 with an interface that is independent of any particular peripheral device (such as the printer 21).

Because the control objects in set 12 are each developed for a particular device class, a control object instance is created by the COM supported by the OS 14 when the POS application program 11 is run, and the control object instance is bound to the POS application program 11. Each service object in set 13 provides a uniform interface, independent of a particular device, for the corresponding control object in set 12; when a particular device is called by a control object, a service object instance is created and bound to the POS application program 11.

In a COM-based system, for example, ActiveX controls (OLE controls) that can return events to the program 11 can be used for a control object, and an ActiveX server (OLE automation server) operating as a server for ActiveX controls can be used as a service object. The COM provides support for data communications between objects bound by automation, that is, between instances of objects bound in order to run the application program. "Automation server" is a software object containing both properties and methods, and "automation" is a mechanism for publishing or manipulating objects.

Automation is dependent upon the COM IDispatch interface, and communication between objects is accomplished by running the Invoke method. IDispatch is an interface for publishing ActiveX controls and ActiveX server methods and properties for use by a COM-compatible programming language. The Microsoft Foundation Class Library (MFC), which provides a developing environment with an automation function based on Visual C++, an object-oriented programming language published by Microsoft, provides the COleDispatchDriver base class (object) for handling the complexities of calling the Invoke function from the application program or client object. A client object can therefore send data to a server object by calling InvokeHelper, a member function of the interface object derived from this base class. In other words, a specific process must be run in order to use the Invoke function, and an InvokeHelper function containing this predefined process is provided to help call the Invoke function. This predefined process includes, for example, reading arguments from a list and running a process based on these arguments, converting the Invoke result to a method, or throwing exceptions when an illegal process is run.

FIG. 2 schematically shows the flow of data from a POS application program 11 to a device (e.g., printer 21). In order to print text data on the printer 21, the POS application program 11 calls the print method of the printer control object in set 12 and passes the text data to the print method. In order to call the method of the service object in set 13 for the printer 21, the printer control object calls the InvokeHelper member function of the COleDispatchDriver class (the interface object (IFO) 18). The data is then passed through the interface object 18 to the printer service object in set 13, and through the OS 14 to the printer 21.

One problem is that if a null character (0x00 in hexadecimal; all character data noted below is also in hexadecimal), such as is sometimes contained in bar code data, is present in the text data (character string), the character string will not be reproduced on the printer 21 of the POS system 10. The printer control object in a POS system typically has a PrintBarCode method, and if a data string containing a null (0x00) character is specified in the data parameter of the PrintBarCode method, the data string is passed by a process such as follows.

First, the POS application program 11 sends the following character string A0 to the control object.

A0: 7B 41 00 30 31 32 33 34 35 36 37 38 39

The control object receives character string A0 declared as a LPCTSTR type. An LPCTSTR is a pointer to a null-terminated (0x00) 8-bit ANSI (American National Standard Institute) string, as well as a character string of Shift JIS (Japanese Industrial Standard)-defined characters. A null (0x00) character is therefore not allowed in the middle of the string. When not trying to print byte data as image data, null (0x00) data is not contained in the printable characters, and character string data is generally declared as a LPCTSTR type in the printer control object.

In a COM environment, however, COM supports application-object and object-object data transfers with character strings passed through COM as BSTR strings, that is, basic or binary strings containing a string length (character count) declaration. String A0 is thus converted to A1.

A1: 0D 00 00 00 7B 41 00 30 31 32 33 34 35 36 37 38 39 00

A BSTR string thus starts with the string length written to the first four bytes, and ends with 00 (which is not included in the string length (character count)). Note, however, that this 00 is not used as the terminating character. Data memory is managed based on the number of characters from the pointer so that even a null (0x00) character contained in the character string is treated as character data.

In order for the printer control object to call the print output method of the printer service object, the printer control object first calls the InvokeHelper member function of the COleDispatchDriver class (interface object 18 provided as an MFC library), and InvokeHelper calls InvokeHelperV as follows:

void COleDispatchDriver::InvokeHelperV(DISPID dwDispID, WORD wFlags, VARTYPE vtRet, Void* pvRet, const BYTE* pbParamInfo, va_list argList), where the parameters are defined as follows:

--- dwDispID: Identifies the method or property to be invoked;
wFlags: Flags describing the context of the call to IDispatch::Invoke;
vtRet: Specifies the type of the return value;
pvRet: Address of the variable that will receive the property value or return value;
pbParamInfo: Pointer to a null-terminated string of bytes specifying the types of the parameters stored in the argList following pbParamInfo; and
argList: list of parameters.

---

COleDispatchDriver::InvokeHelperV thus converts a character string as follows:

---

```
LPCSTR lpsz = va_arg(argList, LPSTR);
pArg->bstrVal=::SysAllocString(T2COLE(lpsz));
if (lpsz != NULL && pArg->bstrVal == NULL)
    AfxThrowMemoryException();
pArg->vt = VT_BSTR;
```

---

Because the character string lpsz passed from the control object is declared by an 8-bit Shift JIS as an LPCTSTR, the character conversion macro T2COLE is automatically selected and the characters are converted to 16-bit wide characters (Unicode), the basic transfer string type passed by COM. T2COLE is defined as a model library (ATL: Active Template Library) for creating ActiveX controls using Visual C++.

The first line above directs the reading of the data parameters from the parameter list, and the data is then actually converted by the next line. The character conversion macro T2COLE invokes the AfxA2Whelper function wherein MultiByteToWideChar converts the data to wide characters as shown below.

A2: 7B 00 41 00 00 00

That is, because the control object declares the character string a null-terminated LPCTSTR type, the null (0x00) characters contained in the middle of the character string are interpreted as terminating the character string. The result is a character string of a wide character (LPCTSTR) type not containing any data following 00 and deleting everything after 00. The character string is then converted by SysAllocString to a BSTR type containing data about the number of characters (actually bytes) in the string, which is passed through COM to the service object.

The data passed to the service object after the four string length bytes are added is thus:

A3: 04 00 00 00 7B 00 41 00 00 00

Like the control object, the service object also uses LPCTSTR to declare character data, and receives data in 8-bit units according to the declared character string data type by COM. The service object thus receives:

A4: 7B 41 00

The printer 21 controlled by the printer service object is thus unable to print the data specified by the application program 11, and only prints part of the specified data (that is, the received data, A4). While the string data sent by COM is BSTR type and character string A4 can be cast and processed as a BSTR type, the data in memory only contains the string length information of the BSTR type as shown below, and the data omitted when transferred from the control object is lost.

A5: 02 00 00 00 7B 41 00

Thus, if the control object receives string data declared as a LPCTSTR type containing a null (0x00) character from the POS application program 11, this string data cannot be sent to the service object and properly output on the printer 21.

Furthermore, changing the declared string data type in the control object or service object cannot be employed in an object-oriented POS system desiring to provide a uniform interface to the application program and unify the parameters exchanged between objects and between the application program and objects. It is also not desirable from the perspective of protecting the current software assets of the user.

There are methods for forcibly converting null (0x00) data using binary conversion to some other value before data transfer, and then restoring null (0x00) data in a following object. In addition to being complicated, however, the conversion processes used by the different objects must match, and the receiving object is therefore dependent upon the design (operation) of the sending object. This is contradictory to one goal of object-oriented programming, which is to improve software reusability and modularity. Furthermore, if the receiving object cannot process the binary converted data, it might output a completely different character string.

Processing character string data containing null (0x00) data thus presents some difficult problems. In order to build a POS system capable of handling bar codes and other different data types, however, it is necessary to be able to accurately send character data containing null (0x00) data to the service objects for output by a printer or other device.

OBJECTIVE OF THE INVENTION

It is therefore an objective of the present invention to provide a character data processing method, processing system, and object program whereby character string data can be sent accurately between objects even when the character string contains null (0x00) data without changing the character string type declaration of the control object or service object and without performing other complicated operations.

SUMMARY OF THE INVENTION

To achieve this objective, a first aspect of the present invention involves a character string data processing method for passing a first character string from a client or first object (such as a control object), through an interface object running under a computer operating system (such as the above-noted COM), to a server or second object (such as a service object) when an application program is run. The method comprises casting, in the interface object, the first character string data as basic string data whereby a number of characters including null (0x00) data in the character string data is countable irrespective of the declared type of the first character string data of the first object, detecting the number of characters including the null characters in the first character string as a basic string, and converting this number of characters in the first character string to character string data that can be passed by the operating system. The method further includes processing, in the second object, the first character string data as basic string data irrespective of the declared type of the first character string data.

In another aspect of the invention, a character string data processing system having a client or first object, a second object that is a server with respect to the first object, and an interface object for passing a first character string from the first object to the second object running an application program is provided. The interface object has means for casting the first character string data as basic string data whereby the number of characters including null (0x00) data in the character string data is countable irrespective of the type of the first character string data declared by the first object, detecting an effective number of characters in the first character string as a basic string, and converting the effective number of characters in the first character string to character string data that can be passed by the operating system. The second object has means for processing the first character string data as basic string data irrespective of the declared type of the first character string data.

The effective number of characters including null (0x00) data contained in the first character string passed from one object can be determined by processing character strings as basic string data enabling the number of characters, including null (0x00) characters, in the string to be counted regardless of the string type declared by the object. Furthermore, by converting only the actual number of characters in the first character string to string data that can be passed by the operating system, a character string containing null (0x00) data that can be reliably passed without the null (0x00) characters terminating the string can be created regardless of the declared type of the string data. Character string data containing null (0x00) data can thus be reliably passed between objects even on integrated systems or architectures, such as COM, that only support passing standardized types of character string data between objects.

The basic string data is character string data containing string length information, such as COM-supported BSTR type string data.

The above data transfer problems are not limited to object-object communication, but also occur when passing data between application programs and objects. These problems thus occur when the application program is written, for example, using MFC in Visual C++. (Note that these problems do not occur when the application program is written with Visual Basic published by Microsoft because MFC is not used by such programming languages.) Therefore, the first object is the application program or a peripheral device class control object; and the second object is a control object or a peripheral device service object. The present invention can thus be applied to application programs by making the application program the first object. Therefore, an object as used below includes instances of objects linked by the COM binding mechanism when the application program is run, and unless otherwise specifically noted no distinction is made between an object and an instance.

The character string data processing method and system of the present invention can thus reliably pass between objects character string data containing null (0x00) data in the string even when the character string type declared by an object presumes that no null (0x00) data is contained in the string. The method and system of the invention can therefore process bar code data and other character string data that could contain null (0x00) data without changing the data type declared by the conventional object. An object-based POS system that can reliably handle bar code data and various other data types can thus be provided by means of the present invention.

Another aspect of this invention involves a client object program when running the application program. This object program has an instruction for passing first character string data to an object that is a server object relative to the client object by invoking an interface object capable of passing the first character string data through the operating system to the server object. This instruction has an executable command for running a process invoking the interface object to cast the first character string data as basic string data whereby the number of characters including null (0x00) data in the character string data is countable irrespective of the object-declared type of the first character string data. The passing instruction also has instructions for detecting an effective number of characters in the first character string as a basic string, and converting the effective number of characters in the first character string to character string data that can be passed by the operating system.

Still another aspect of the present invention involves a server object program when running the application program. This object program has an executable command for processing first character string data passed to the server object from a client object thereof through an interface object running on an operating system as basic string data whereby the number of characters including null (0x00) data in the character string data is countable irrespective of the object-declared type of the first character string data.

An interface object according to the present invention can be provided as an interface object program for passing a first character string through the computer operating system from a client or first object to a server or second object when an application program is run. This interface object has an executable command for casting the first character string data as basic string data whereby a number of characters including null (0x00) data in the character string data is countable irrespective of the declared type of the first character string data of the first object, detecting an effective number of characters in the first character string as a basic string, and converting the effective number of characters in the first character string to character string data that can be passed by the operating system.

Each of the object programs described above can be provided on an appropriate computer-readable medium such as a magnetic disk.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The present invention is described below in the context of a POS system built from distributed objects, such as the POS system 10 described with reference to FIGS. 1 and 2. In order to apply the present invention to a POS system 10 it is first necessary to derive a CCoOleDispatchDriver class interface object from the MFC COleDispatchDriver class, and then override the data conversion part of the interface object as follows:

```
LPCSTR lpsz = va_arg(argList, LPSTR);
long lLen = ::SysStringByteLen((BSTR)lpsz);
long lDestLen = lLen + 1;
LPWSTR pWideChar = (LPWSTR)CoTaskMemAlloc(lDestLen
    * 2 *
sizeof(WCHAR));
long lTrueLen;
if(lLen){
    lTrueLen = MultiByteToWideChar(CP_ACP, 0, lpsz, lLen,
        pWideChar, lLen);
}
else{
    lTrueLen = MultiByteToWideChar(CP_ACP, 0, lpsz, 0,
        pWideChar, lDestLen);
}
pArg->bstrVal = ::SysAllocStringLen(pWideChar, lTrueLen);
```

-continued

```
CoTaskMemFree((void*)pWideChar);
if(lpsz != NULL && pArg->bstrVal == NULL)
    AfxThrowMemoryException();
pArg->vt = VT_BSTR;
```

This data conversion process is performed as follows. First, the character string parameter is read from the parameter list argList and assigned to string lpsz of type LPCSTR. The following lines then cast string lpsz as BSTR type, and determine the length (character count) of the character string, including any null (0x00) characters that might be present in the string. To assure that string length lLen is never 0, 1 is added to lLen, and memory is reserved to convert the character string to wide characters, that is, Unicode characters (the standard character code used by COM). String lpsz is then converted to wide characters using the string length specified by lLen, and the result is stored to string pWideChar of type LPWSTR.

The string is then converted to BSTR type parameter parg, using the string length specified by lLen, for transfer to the service object through COM. After the conversion is completed, the memory reserved for wide character conversion is released. An exception is thrown if an illegal parameter is encountered. The character string parg passed to the service object is then set as type BSTR.

Figure 1:
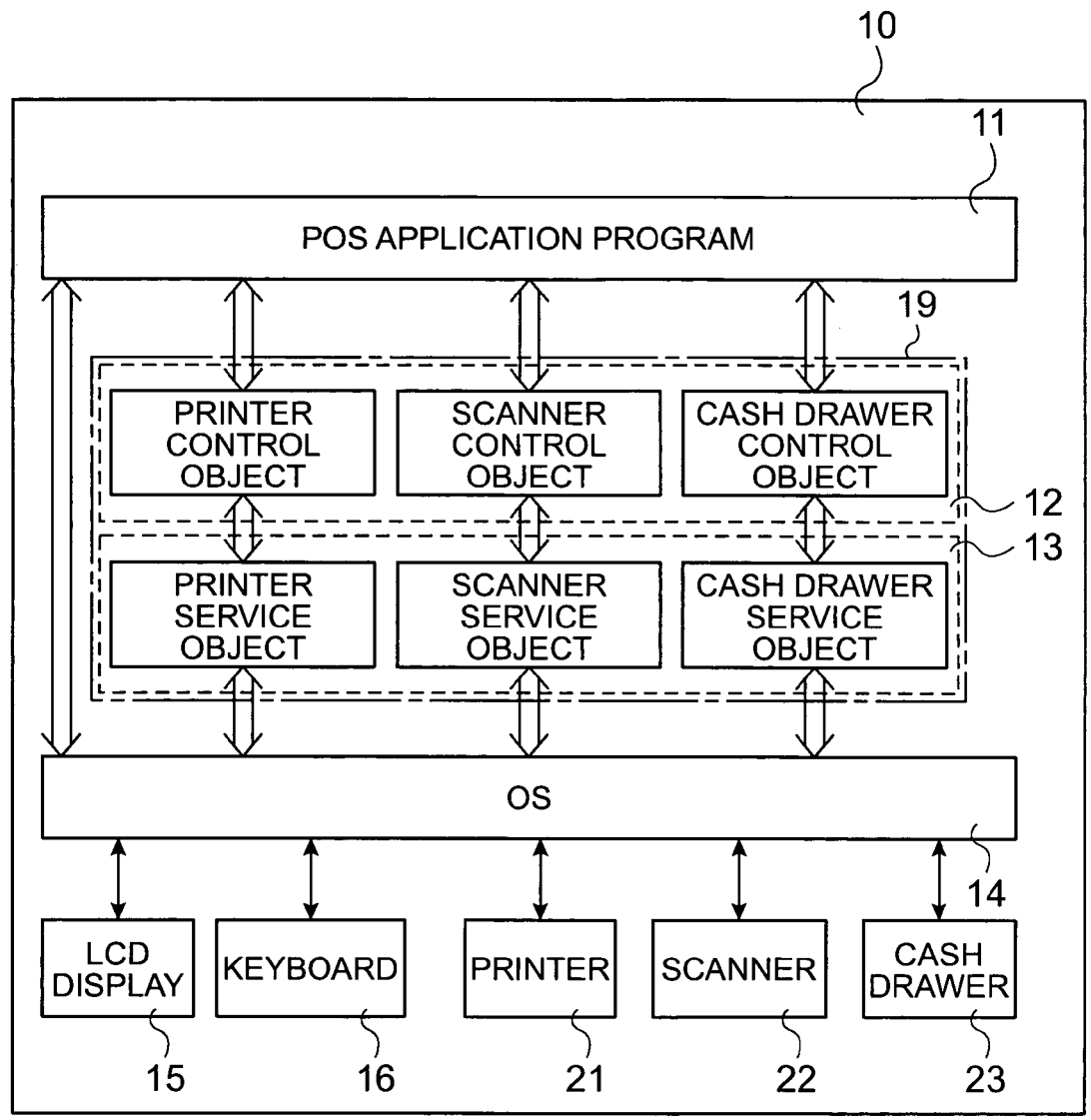
FIG. 1 illustrates an object-based POS system.
Figure 2:
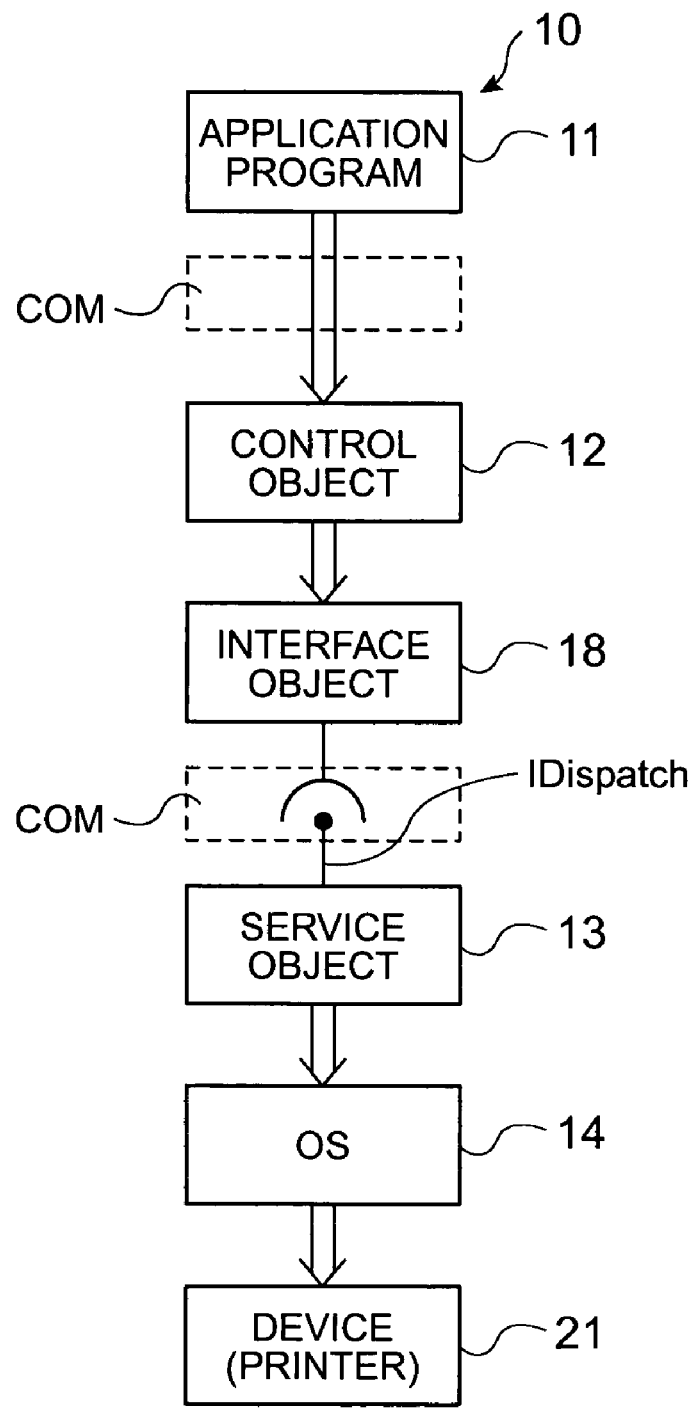
FIG. 2 shows a process for transferring character strings between an application program and objects.
Figure 3:
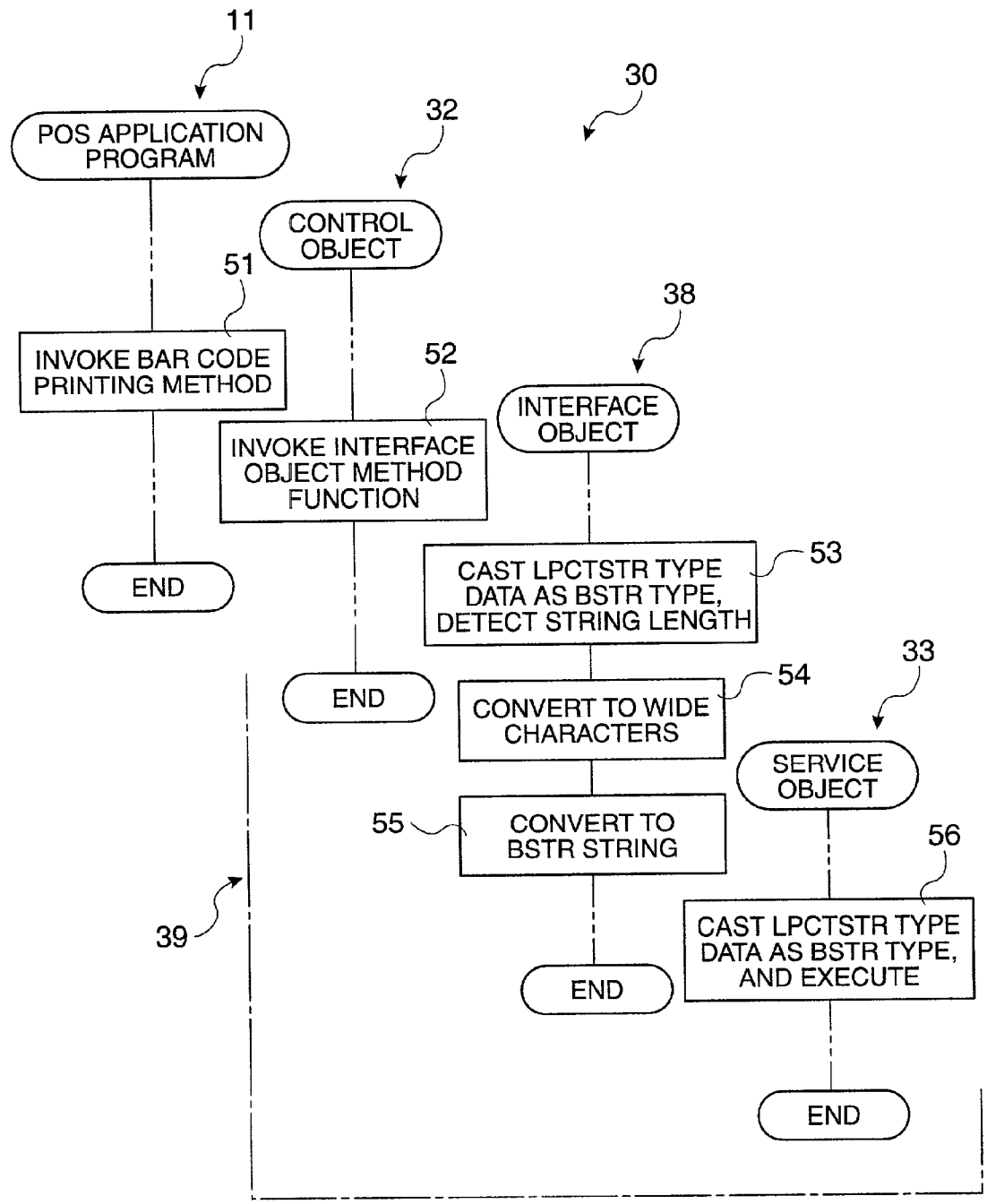
FIG. 3 illustrates the processing of control objects, interface objects, and service objects in accordance with the invention.

The overall configuration of POS system 30 shown in FIG. 3 is thus the same as the system 10 shown in FIG. 1, but the handling of the data is different. Data is handled via control object 32, interface object 38, and service object 33, in accordance with the invention as shown in FIG. 3. When the POS application program 11 invokes the PrintBarCode method, which is a method for printing a bar code, in step 51 and passes a character string A0 containing null (0x00) data as shown below, the control object 32 receives a BSTR type character string A1as shown below.

| A0: | 7B | 41 | 00 | 30 | 31 | 32 | 33 | 34 | 35 | 36 | 37 | 38 | 39 | | | |
| A1: | 0D | 00 | 00 | 00 | 7B | 41 | 00 | 30 | 31 | 32 | 33 | 34 | 35 | 36 | 37 | 38 | 39 | 00 |

In order to pass the bar code character string to the service object 33, in step 52 the control object 32, instead of invoking COleDispatchDriver, invokes the CCoOleDispatchDriver class InvokeHelperV function, as shown below, which is a function of interface object 38, overriding the conversion function as described above.

```
void  CCoOleDispatchDriver::InvokeHelperV(DISPID  dwDispID,
    WORD
wFlags, VARTYPE vtRet, Void* pvRet, const BYTE* pbParamInfo,
va_list argList)
```

As shown above, the interface object 38 receives string lpsz declared as type LPCTSTR from the control object 32, but casts string lpsz as type BSTR to detect the string length (step 53). The interface object 38 then converts the string to wide characters without dropping the string length data for transfer via COM (step 54), and then sets parameter pArg transferred to the service object BSTR type wide character string (step 55). The interface object 38 in this embodiment thus outputs a character string as shown below.

First, character string A1is converted to character string A2'in step 54 by specifying the string length and then converting the string to wide characters using the MultiByteToWideChar string conversion function.

A2': 7B 00 41 00 00 00 30 00 31 00 32 00 33 00 34 00 35 00 36 00 37 00 38 00 39 00

All data following the null (0x00 ) character in string A1 is also converted to wide characters in this embodiment, in contrast to the conventional conversion process described above, as a result of declaring the length of string A1. This wide character string is then converted in step 55 by the SysAllocStringLen character conversion macro to BSTR type string A3'of Unicode characters for transfer by COM.

A3': 1A 00 00 00 7B 00 4100 00 00 30 00 3100 32 00 33 00 34 00 35 00 36 00 37 00 38 00 39 00 00 00

As a result of this conversion process all string data supplied from the POS application program 11, including null (0x00 ) data, is passed to the service object 33.

However, the service object 33 receives the following string A4 because parameter pData for receiving the string data is declared as a null-terminated LPCTSTR type.

A4: 7B 41 00

It will thus be understood that if the character string is handled as the declared LPCTSTR type, all data following null (0x00 ) data will be dropped and cannot be processed. However, when the string data is passed by COM as described above, the data is passed in memory as a BSTR type to the receiving object. This means that in the service object the parameter type is simply declared as LPCTSTR by the function prototype (function type definition) and the actual data is BSTR type. The actual data in memory before and after string A4 is as A5' as shown below.

A5': 0D 00 00 00 7B 41 00 30 31 32 33 34 35 36 37 38 39 00
The service object 33 therefore processes the parameter pData declared as
LPCTSTR type as BSTR type data in step 56.
    lDataLen = SysStringByteLen((BSTR)pData);
    CString strBinaryData (pData, lDataLen);

That is, the parameter pData declared as LPCTSTR type is cast as BSTR type, the string length is detected, and MFC CString class variable strBinaryData is set to pData of string length lDataLen for printing. As a result, a character string containing a null (0x00 ) character supplied from the POS application program 11 is sent from the service object 33 to the printer without stripping null (0x00 ) data and the following data, and can thus be output from the printer.

While the interface object 38 for passing data from the control object 32 to the service object 33 through COM is thus derived from an MFC base class, it can cast a null-terminated character string of LPCTSTR type as BSTR type data containing string length information that can also contain the null character (00 ) so that the actual number of characters (effective string length) can be determined. That number of characters can therefore be converted to wide characters irrespective of the LPCTSTR string type, and the data can thus be converted to a standard Unicode string handled by COM.

It will thus be apparent from the foregoing description that the present invention can accurately pass character string data containing a null (0x00 ) character between objects, whereas a conventional interface object derived from an MFC class strips all data following the null (0x00 ) character when the data is passed by COM between objects if the data is declared as a LPCTSTR type or other null-terminated string data. This is also the case when the programmer of an application program uses an interface object derived from an MFC class instead of marshalling (a mechanism for invoking a method, for example, through COM). That is, by using the interface object of the present invention the application program can send data including the null (0x00 ) character to the control object without dropping the null (0x00 ) character and the following data.

It is also not necessary to change the specifications of a distributed object POS control system providing a uniform API to the application program because problems conventionally related to the null (0x00 ) character data when the character string is declared an LPCTSTR type can be prevented in the control and service objects in accordance with this invention. The present invention thus enables both the application program provider and the program user to take advantage of a POS control system that can reliably handle string data containing the null (0x00 ) character without wasting existing software resources.

As noted above, there are methods whereby a conventional interface object that converts null-terminated strings can forcibly handle string data containing the null (0x00 ) character by using binary conversion to forcibly convert the null (0x00 ) character to another value. The converted data is sent to another object, and the receiving object then restores the null (0x00 ) character. However, not only is this a complicated process, the conversion operations of the sending and receiving objects must match, and the receiving object becomes dependent upon the sending object. This technique is difficult to implement because it is contradictory to the software modularization and reusability goals of object-oriented programming. Furthermore, if the receiving object cannot handle binary converted data, it might output a completely different string.

With the method of the invention described above, however, the null (0x00 ) character and the following data can be passed without binary conversion to the next object. The data can therefore be processed by the receiving object as null-terminated string data, or the data can be cast and processed as a BSTR type containing the null (0x00 ) character. For example, a method for handling string data that will never contain binary data can process the data as a null-terminated string, while a method that could encounter binary data casts the string data as BSTR type for processing. A control system that can handle the null (0x00 ) character data while having no effect on existing objects can thus be provided.

The control object 32, the service object 33, and the interface object 38 of this POS control system 39 can be recorded as a computer program having commands for executing the various steps shown in FIG. 3. The program may be recorded on any suitable computer-readable data storage medium, such as a Compact Disc (CD) or other such tangible medium, or may be carried on an electromagnetic carrier wave signal that may be transmitted over a network or wirelessly. By installing the program in memory managed by the OS 14 of the computer and invoking the methods and properties of the objects, instances of the objects are generated and bound to execute the desired application program processes.

It should be noted that while the invention has been described with reference to a POS system, the invention is not so limited. A POS system is exemplary of an application with a high likelihood of actually processing null (0x00 ) data because of the wide range of bar codes and other data handled by the typical POS system. However, the invention can be used with other systems that handle string data.

As will be understood from the preceding description, the present invention enables string data containing null (0x00) data in the string to be passed accurately and reliably between objects without using binary conversion to convert the string data to a special format. The present invention can therefore provide a method and system for processing string data, such as bar code data, that can contain null (0x00) within the string. The invention can further provide a software development tool for enabling a POS system or other system that potentially handles a variety of data types.

While the invention has been described in conjunction with specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A character string data processing method for passing a first character string from a first object, through an interface object running under control of a computer operating system, to a second object, when an application program is run, the method comprising:

casting, in the interface object, the first character string declared as a first data type as a basic string data type, whereby the number of characters including null data in the first character string is countable irrespective of the declared type of the first character string, detecting an effective number of characters in the first character string by analyzing its basic string data type representation, and converting the effective number of characters in the first character string to a second character string that can be passed by the operating system to the second object, without using binary conversion to convert the first character string to a special format; and processing, in the second object, the second character string, which is declared as the first data type, as a basic string data type, irrespective of the declared type of the second character string.

2. The method of claim 1, wherein the basic string data type representation of the first character string contains string length information.

3. The method of claim 1, wherein
the application program can process a character string containing null data;
the first object is the application program or a peripheral device class control object; and
the second object is a peripheral device class control object or a peripheral device service object.

4. The method of claim 3, wherein the character string is bar code data.

5. The method of claim 3, wherein the application program is a POS application program.

6. A character string data processing system having a processor, comprising a first object that is a client object, a second object that is a server object with respect to the first object, and an interface object for passing a first character string from the first object, through the interface object, to the second object running an application program, wherein:

the interface object comprises means for casting the first character string declared as a first data type as a basic string data type, whereby the number of characters including null data in the first character string is countable irrespective of the declared type of the first character string, means for detecting an effective number of characters in the first character string by analyzing its basic string data type representation, and means for converting the effective number of characters in the first character string to a second character string that can be passed by the operating system to the second object, without using binary conversion to convert the first character string to a special format; and the second object comprises means for processing the second character string, which is declared as the first data type, as a basic string data type, irrespective of the declared type of the second character string.

7. The system of claim 6, wherein the basic string data type representation of the first string contains string length information.

8. The system of claim 6, wherein
the application program can process a character string containing null data;
the first object is the application program or a peripheral device class control object; and
the second object is a peripheral device class control object or a peripheral device service object.

9. The system of claim 8, wherein the character string is bar code data.

10. The system of claim 8, wherein the application program is a POS application program.

11. A computer-readable medium carrying an object program that is a client object when an application program is run, the object program comprising:

instructions for passing first character string to a server object relative to the client object by invoking an interface object capable of passing the first character string through an operating system to the server object; and wherein the passing instruction has an executable command for running a process invoking the interface object to cast the first character string declared as a first data type as a basic string data type, whereby the number of characters including null data in the first character string is countable irrespective of the object-declared type of the first character string, the passing instruction further having instructions for detecting an effective number of characters in the first character string by analyzing its basic string data type representation, and converting the effective number of characters in the first character string to a second character string that can be passed by the operating system to the server object, without using binary conversion to convert the first character string to a special format.

12. The computer-readable medium of claim 11, wherein the object program is an application program capable of processing a character string containing null data, or a peripheral device class control object.

13. The computer-readable medium of claim 11, wherein the first character string is bar code data, and the application program is a POS application program.

14. A computer-readable medium carrying an object program that is a server object when an application program is run, the object program comprising:

an executable command for casting a first character string, passed to the server object from a client object thereof through an interface object running on an operating system, declared as a first data type, as a basic string data type, whereby the number of characters including null data in a middle portion of the first character string is countable irrespective of an object-declared type of the first character string, and processing the effective number of characters in the first character string determined from an analysis of its basic string data type representation, wherein the effective number of characters was obtained as a result of a non-binary conversion.

15. The computer-readable medium of claim 14, wherein the object program is a peripheral device class control object, or a peripheral device service object.

16. The computer-readable medium of claim 14, wherein the first character string is bar code data, and the application program is a POS application program.

17. A computer-readable medium carrying an interface object program for passing a first character string through a computer operating system from a client or first object to a server or second object when an application program is run, the interface object program comprising:

an executable command for casting the first character string declared as a first data type as a basic string data type, whereby the number of characters including null data in the first character string is countable irrespective of the declared type of the first character string of the first object, detecting an effective number of characters in the first character string by analyzing its basic string data type representation, and converting the effective number of characters in the first character string to a second character string that can be passed by the operating system to the second object, without using binary conversion to convert the first character string to a special format.

18. The computer-readable medium of claim 17, wherein the basic string data type representation of the first character string contains string length information.

* * * * *